United States Patent [19]

Ziu

[11] Patent Number: 5,205,592
[45] Date of Patent: Apr. 27, 1993

[54] UNDERGROUND CONAINMENT TANK AND PIPING ASEMBLY

[75] Inventor: Christopher G. Ziu, Somerville, Mass.

[73] Assignee: Double Containment Systems, Monroe, Conn.

[21] Appl. No.: 719,840

[22] Filed: Jun. 24, 1991

[51] Int. Cl.⁵ .................................. F16L 11/12
[52] U.S. Cl. ................................ 285/45; 285/121; 285/138; 52/20; 52/21; 405/52
[58] Field of Search .............. 285/121, 45, 138; 52/218, 220, 20, 21; 405/157, 52; 220/3.2, 3.8, 3.7, 327; 174/50.5

[56] References Cited

U.S. PATENT DOCUMENTS

| | | | |
|---|---|---|---|
| 734,153 | 7/1903 | Baker, Jr. ............................ | 52/20 |
| 1,104,395 | 7/1914 | Vibber ................................ | 285/121 |
| 1,213,478 | 1/1917 | Haase ................................. | 220/3.8 |
| 1,350,306 | 8/1920 | Forshee et al. ..................... | 52/20 |
| 1,395,807 | 11/1921 | Forni .................................. | 220/3.8 |
| 1,537,008 | 5/1925 | Forni .................................. | 52/20 |
| 1,591,760 | 7/1926 | Haase ................................. | 52/20 |
| 1,719,224 | 7/1929 | Haase ................................. | 52/20 |
| 2,883,853 | 4/1959 | Forni .................................. | 52/21 |
| 3,039,275 | 6/1962 | Lacaze et al. ...................... | 62/45 |
| 3,156,490 | 11/1964 | Myll ................................... | 285/121 |
| 3,385,012 | 5/1968 | Lovegreen ......................... | 52/21 |
| 3,621,623 | 11/1971 | Downes ............................. | 52/20 |
| 3,626,823 | 12/1971 | Toth .................................. | 94/31.1 |
| 3,695,153 | 10/1972 | Dorris ................................ | 52/21 |
| 3,698,194 | 10/1972 | Flynn ................................ | 61/11 |
| 3,731,448 | 5/1973 | Leo .................................... | 52/220 |
| 3,930,372 | 1/1976 | Norman ............................. | 52/21 |
| 4,102,088 | 7/1978 | Keller et al. ....................... | 52/20 |
| 4,619,555 | 10/1986 | Skinner et al. .................... | 285/138 |
| 4,751,799 | 6/1988 | Ditcher et al. .................... | 52/21 |
| 5,030,033 | 7/1991 | Heintzelman et al. ............ | 405/128 |
| 5,081,802 | 1/1992 | Westhoff et al. .................. | 52/20 |

FOREIGN PATENT DOCUMENTS 0029627 3/1977 Japan ................................. 285/45

Primary Examiner—Dennis L. Taylor
Assistant Examiner—Heather Chun
Attorney, Agent, or Firm—Kramer, Brufsky & Cifelli

[57] ABSTRACT

An underground double containment system consists of a concrete outer containment receptacle housing a primary fluid flow pipe which extends therethrough and is slidably supported on double I-beam structures within the concrete receptacle. The concrete receptacle can be provided with a removable cover providing access to the primary piping in modular sections defined by the boundary of the receptacle. The primary piping can expand or move along the longitudinal axis of the concrete receptacle relative to the concrete receptacle enabling thermal of the primary and containment piping outside of the receptacle, which can be formed from different materials, as the outer containment pipe can be connected to the interior of the receptacle at the juncture of the receptacle and the primary piping. A plurality of concrete receptacles can be joined at an angle of between 0° and 180° to provide a double containment system for nonlinear primary pipes.

20 Claims, 4 Drawing Sheets

FIG. 3
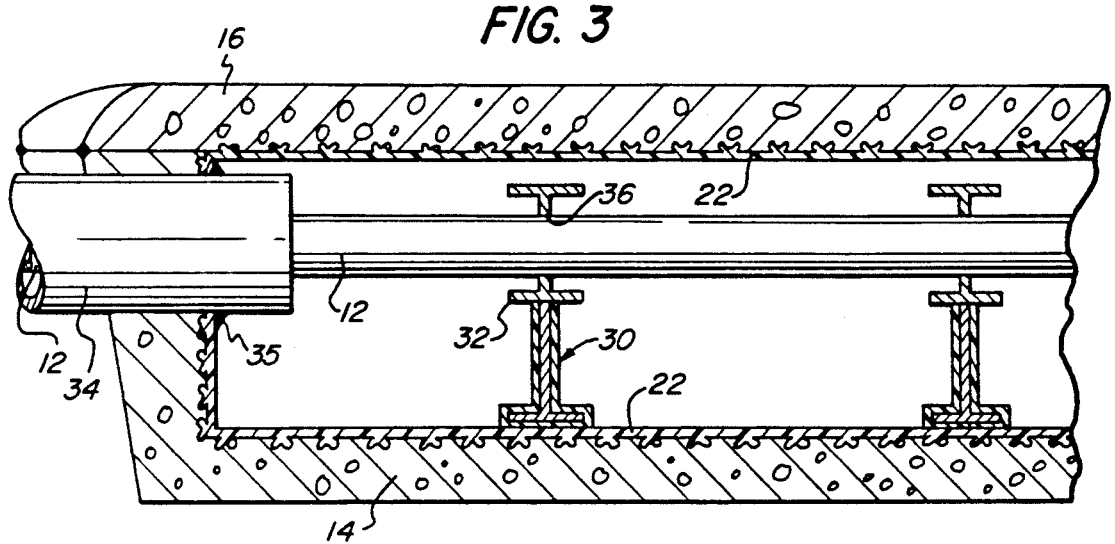
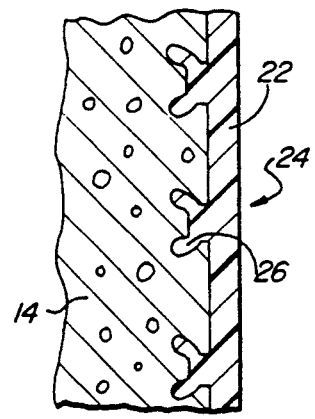
FIG. 4A
(PRIOR ART)
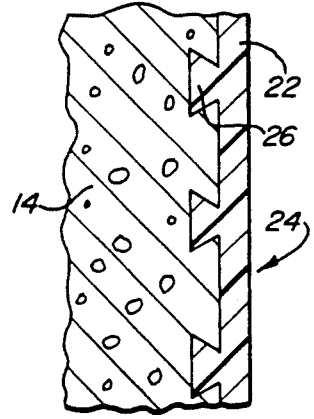
FIG. 4B
(PRIOR ART)
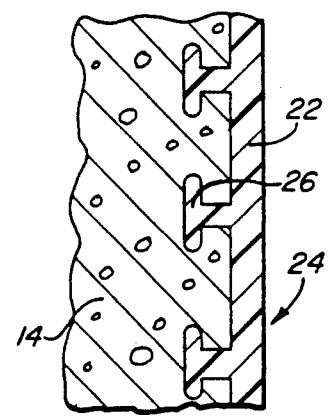
FIG. 4C
(PRIOR ART)
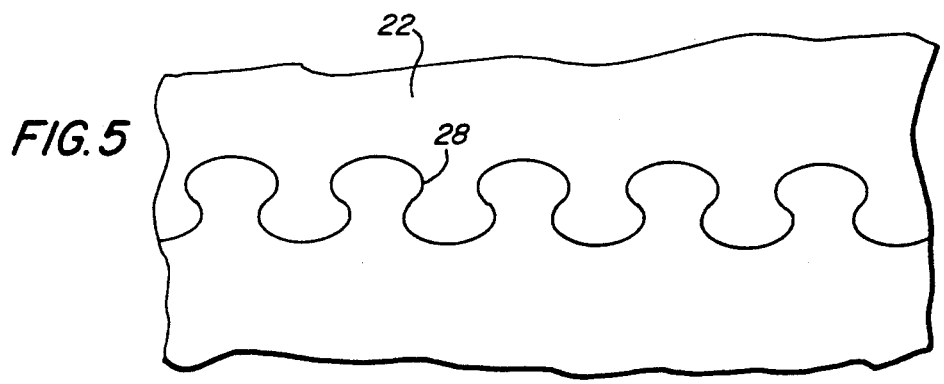
FIG. 5

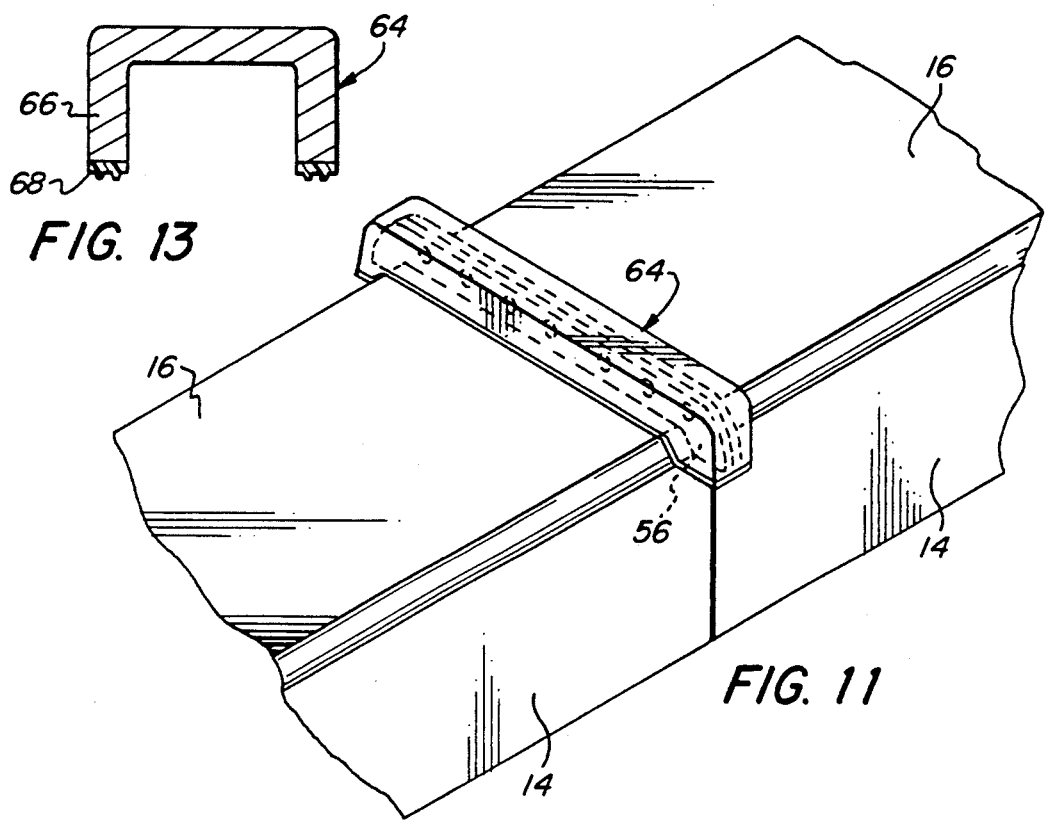
FIG. 13
FIG. 11
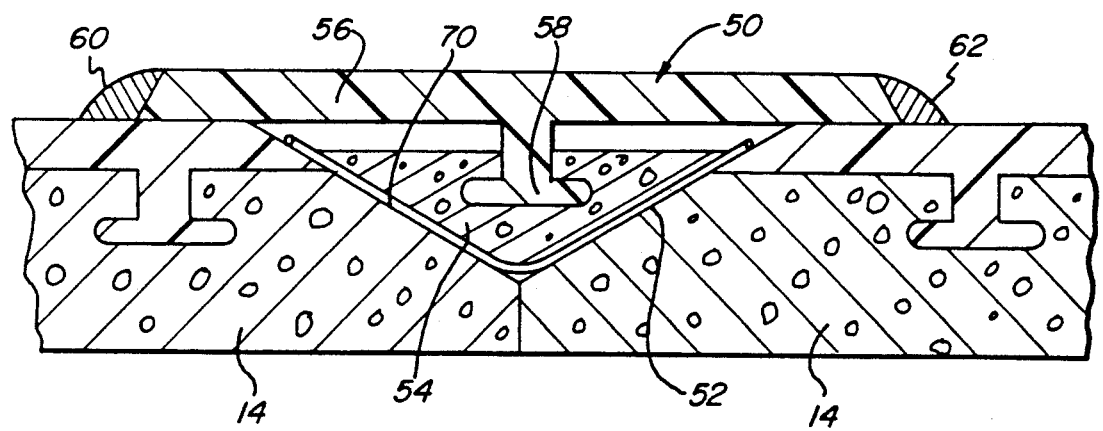
FIG. 12

UNDERGROUND CONAINMENT TANK AND PIPING ASEMBLY

BACKGROUND OF THE INVENTION

1. Field of the Invention

This invention relates to an underground, contained pipe assembly.

2. Description of the Prior Art

Underground tank systems are defined as any system that has 10% or more of its overall volume underground, including associated piping. Such systems are regulated by legislation which require the use of secondary containment with interstitial monitoring for systems that contain or transport hazardous chemicals or substances. The provision of secondary containment is optional for systems that carry or transport oil, gasoline or other petroleum based products, but in any case, the use of corrosion resistant materials is mandatory for new systems. The concept of double containment piping provides the additional degree of safety for pipes that are designed to transport hazardous, toxic or extremely corrosive chemicals. There have been many products developed to date, but the products that have been developed have not completely addressed some of the unique problems that arise when a tank or pipe is placed within another tank or pipe.

One such problem is the ease of maintaining, modifying or repairing such systems. To date, most underground storage tank double wall systems have been installed without having an ability to have ready access to the systems in the event of an upset condition. Therefore, if a repair or modification is to be made, the original system manufacturer/contractor must be called in to facilitate the repair. In many designs, a repair of a certain section would not be feasible or even possible due to the location of the system with respect to adjacent equipment or building parts. In any case, the fact that a tank and/or piping system is directly buried results in an expensive excavation in the event of a repair. What would be very helpful to most facility owners is the ability to have a system that is readily accessible. A system capable of being readily accessible would give the facility engineer the ability to have the tank or pipe section requiring modification or repair capable of being modified without a major excavation and disruption to the business. In some instances, a faulty tank or pipe section could be sent to a shop for repair, and then readily placed back into service.

Another such problem has to do with the ability of associated underground piping systems to withstand the effects of inner and outer piping and components that are subjected to different amounts of thermal expansion and contraction. It is the norm, rather than the exception, that the inner and outer pipes of any double containment piping system are subjected to different amounts of thermal expansion. This situation may arise in several different ways. The most common way involves the situation whereby a hot fluid is transported through the inner pipe. Under this circumstance, the surrounding soil (external that is to the outside diameter of the secondary containment piping), is normally at a lower temperature than the hot fluid. Since there is either an insulating dead air space between the two pipes, or other insulating material (dead air space is always the better form of insulation), the inner piping temperature becomes close to that of the fluid, while the outside piping remains closer to that of the external ambient environment. Therefore, the materials normally grow to different lengths due to their being at different temperatures. Even if the outer pipe were to be at similar temperatures, the surrounding soil would tend to keep the secondary containment piping restrained, if it were properly buried. When this does occur, there are thermal strains that are imposed on interconnecting parts, or interstitial supports that create a contact point between the inner and outer piping, and at fitting locations. The most obvious place where there is a problem potential is at the interconnecting points. However, any place where loads can be transmitted back and forth between the two pipe systems, or anywhere that a fitting can become excessively strained can result in a problem. In the prior art, all interconnecting parts designed for this situation are constructed of a singular material, with such a design that the residual stresses and subsequent strain on the materials can lead to a failure of such parts.

Another problem of existing systems has to do with the ability to combine different inner and outer materials in an efficient manner. Different materials can mean materials that are of a different class (such as metallic-thermoplastic, metallic-reinforced thermosetting plastic, or thermoplastic-reinforced thermosetting plastic), or materials that are within the same class but constitute a different material (such as within the thermoplastic family, combining a fluoropolymer within a polyolefin, or a polyolefin within another polyolefin). The reason that it is desirable to combine materials typically has to do with economics. In other words, it is desirable in many situations to combine an expensive material that is capable of handling a chemical on a full time basis within a less expensive material capable of withstanding the corrosive effects of a chemical for a limited period of time. Another major economic reason has to do with the use of a material for the outside piping capable of withstanding the corrosive effects of soil, thus eliminating the need for expensive coatings, cathodic protection, etc. An application of this would be in combining a metallic material within a non-metallic outside material (such as a thermoplastic) for the reasons just described.

SUMMARY OF THE INVENTION

The new developments disclosed herein hold several significant benefits as compared to the prior art.

A concrete containment tank and associated outer containment piping system is constructed in modular sections with the containment piping sections joined inside of the lined concrete containment tank. Alternatively, the secondary containment system can consist solely of the tank. In either case, ready access to the interior of the tank and its connections is provided through a removable cover or manhole. A primary pipe, through which fluid flows, is supported for longitudinal movement due to thermal expansion within the interior of the concrete containment tank. Another alternative would be to eliminate the tank as part of the design and install the primary piping system (through which the fluid flows) inside of a continuous lined concrete trench, or lined trench that is precast in modular sections and joined together in the field. Because the containment piping is separate from the primary piping, being joined in containing relation through the medium of the concrete containment tank, different materials may be used for the inner and outer piping, for economy purposes.

The double containment system may be formed in straight sections, with all double containment straight lengths terminated inside of the lined-concrete tanks or housings, or the tanks or housings could be designed that would allow straight lengths of primary piping between consecutive tank or housing locations. The straight sections would have to be long enough in order that the bending radius of the primary piping is not exceeded during the extraction, removal and reinsertion processes. Expansion joints could be incorporated as part of any tank or housing coupling. Additionally, the tanks or housings can be disposed in tandem sections at any angle varying from 0° to 180° and joined with an elastomer, if necessary, to permit the primary piping to be joined with other pipes, circumvent obstacles, or be conveyed to a conveniently located correction facility.

Covers to these manholes/trenches/housings/tank containment structures could either be removable, with a water tight seal, or they could be welded using extrusion welding techniques to essentially form a pressure tight compartment.

BRIEF DESCRIPTION OF THE DRAWINGS

Further objects and advantages of the invention will become more apparent from the following description and claims, and from the accompanying drawings, wherein:

FIG. 3 is a partial, longitudinal cross-sectional view of the assembly of FIG. 1;

FIGS. 4A, 4B and 4C are cross-sectional views illustrating prior art methods of joining and locking a plastic liner to the concrete tank of FIG. 1;

FIG. 5 illustrates a sinusoidal-lock seam between portions of a liner seated between the cover and the concrete containment tank to prevent moisture penetration through the interface between the cover and the tank.

FIG. 11 is a partial perspective view illustrating the structure for joining a pair of underground containment tank sections arranged in tandem;

FIG. 12 is a cross-sectional view of the joint between the adjacent tanks of FIG. 11; and FIG. 13 is a cross-sectional view of a secondary protection cover adapted to be placed over the joint illustrated in FIG. 12.

DETAILED DESCRIPTION OF THE PREFERRED EMBODIMENT

Figure 1:
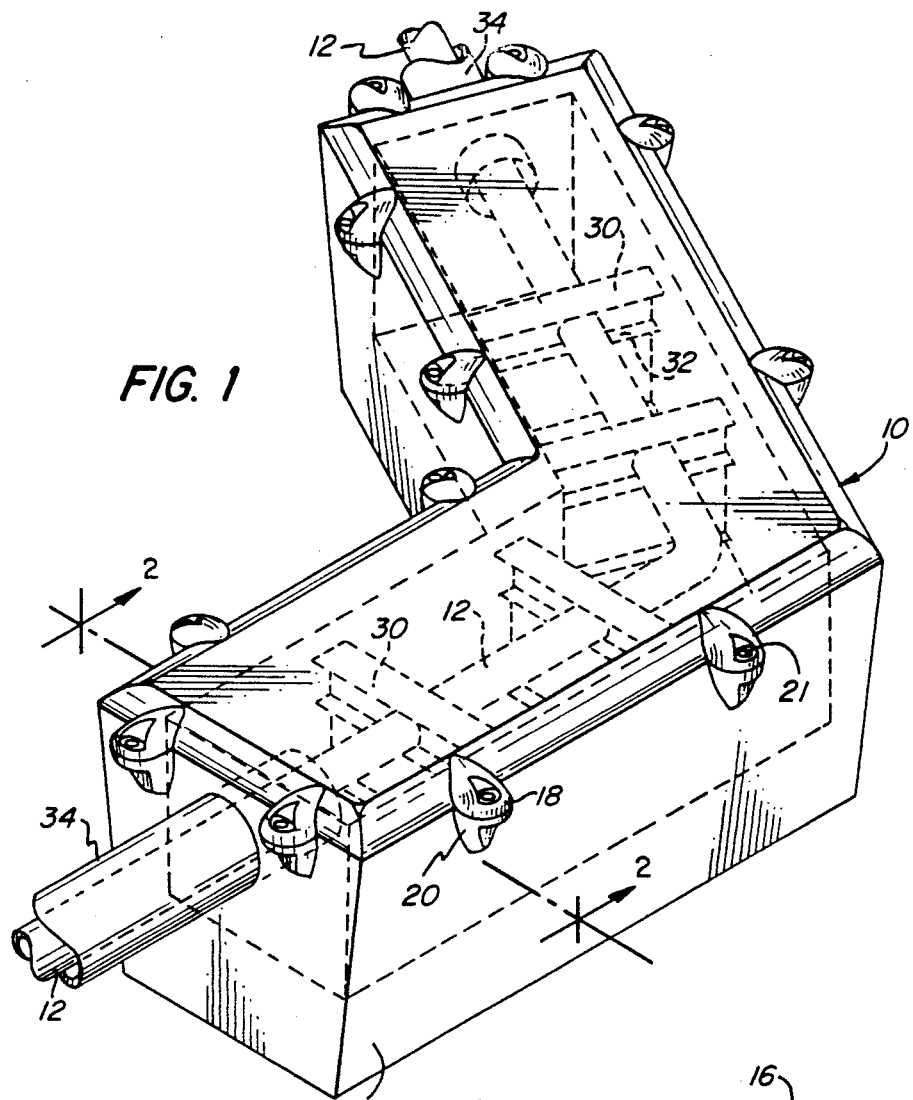
FIG. 1 is a perspective view of one form of an underground containment tank and primary piping assembly comprising the subject matter of the present invention.
Figure 2:
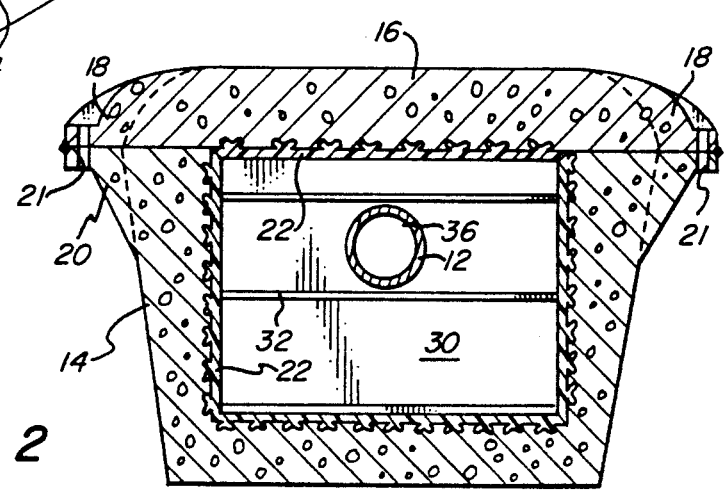
FIG. 2 is a cross-sectional view taken substantially along the plane indicated by line 2—2 of FIG. 1.

Referring now to the drawings in detail, wherein like numerals indicate like elements throughout the several views, the invention consists of a double containment piping and tank system generally indicated at 10.

The system 10 includes a metallic, fiber reinforced thermosetting plastic or thermoplastic inner piping 12 through which the primary fluid conveyed by the system flows. Piping 12 is contained and housed within a thermoplastic-lined concrete encasement or tank 14 provided with a lined cover 16 which is either removable, as shown in FIG. 1, wherein bolt tabs 18 are provided at spaced lengths along the cover which seat on matching tabs 20 extending laterally from the sides of tank 14. Bolts (not shown) are received through aligned openings 21 in the tabs 18,20 to secure the cover 16 on tank body 14. Upon removal of the bolts, the cover 16 can be removed to obtain access to the primary piping 12 for repair or maintenance, as required.

Alternatively, the cover 16 can be removable but provided with manhole access ports, can be totally welded to the tank body 14 with manhole access ports, or totally welded without means for access, if desired. Further, in lieu of forming a concrete encasement or tank 14 and then placing the same underground, a trench can be dug and a polymer concrete poured into the trench between forms to form the containment casement in situ. The system may consist of either the entire single wall inner piping 12 and concrete encasement 14 as shown in FIG. 1, or it may consist of the tanks only with a pipe fitting at each end only.

The encasement or tank 14 and cover 16 is lined with a thermoplastic liner 22 which is accomplished with the use of specially produced thermoplastic studded sheets 24, examples of which are illustrated in FIGS. 4A to 4C, the studs 26 on each sheet 24 being embedded in the surrounding concrete of the encasement tank 14 or cover 16. Portions of a liner 22 can be seated between the cover 16 and encasement or tank 14 and joined together, where needed, along a sinusoidal mechanical lock seam 28 (see FIG. 5) to prevent moisture penetration between the encasement or tank 14 and cover 16. Penetrations through the lined concrete of the encasement or tank 14 and cover 16, as needed, can be accomplished with the use of a mechanical seal (such as Link-Seal by Thunderline Corporation of Minnesota), by the use of water stops that are welded to the pipe and embedded in the concrete, by the use of welding the pipes directly to the sheet lining, or any combination of these.

The lined concrete encasement or tank 14 is also manufactured with a plurality of spaced thermoplastic-coated steel support sections 30 having a double I-beam configuration with a common flange 32. The supports 30 are embedded into the concrete wall of tank 14 or welded to the liner 22 if the I-beam coating is compatible. The support structures 30 support the primary piping 12 which is received through openings 36 in each support structure 30 and additional supports such as clevis hangers, anchors, etc. can be integrated into the design of the system.

An outer containment pipe 34 outside of the access tank 14 may also be embedded in the encasement or tank concrete and welded to liner 22 inside of tank 14, if compatible with the tank, as shown at 35. Because the concrete encasement or tank 14 is provided with pass-through double I-beam supports 30 having openings 36 surrounding the inner or primary piping 12, the piping 12 can expand relative thereto in a longitudinal direction without inducing any thermal stress on the concrete construction. Also, inner piping 12 and outer piping 34 terminating at tank 14 may be formed from different materials since they are not joined to each other directly but only through the concrete encasement or tank 14.

Figure 6:
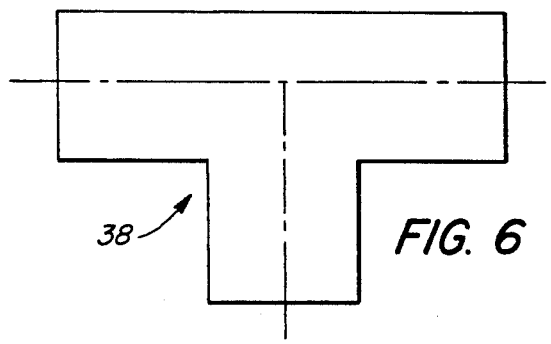
FIGS. 6 to 10 illustrate various configurations of a trench and underground containment tank and primary pipping assembly which can be formed using the components of the present invention.
Figure 8:
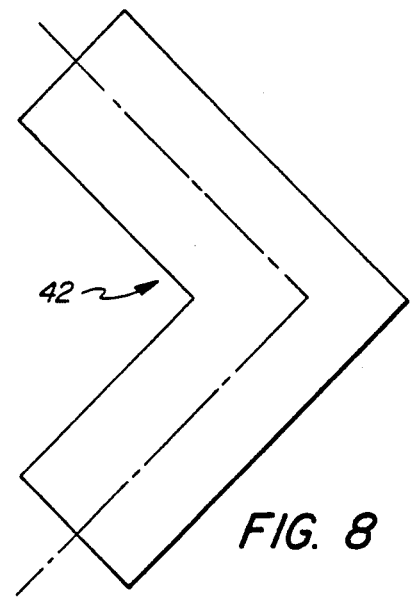
Figure 7:
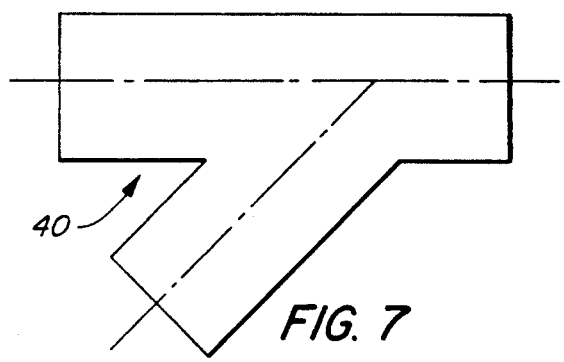
Figure 9:
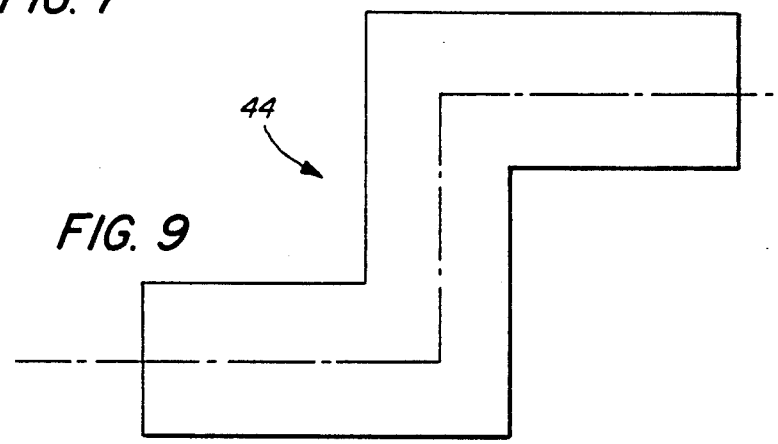
Figure 10:
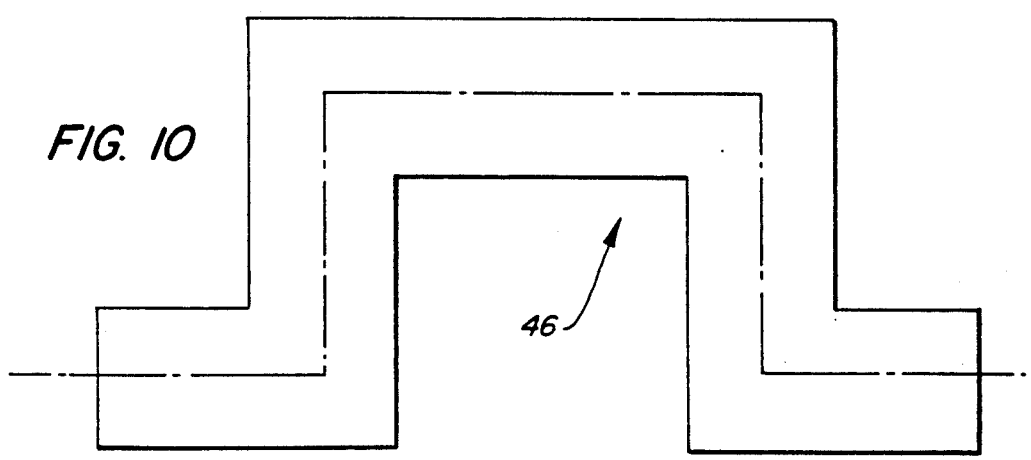

As shown in FIGS. 6 to 10, the concrete lined trench/encasement/tank 14 with its cover 16 may be formed having different configurations depending upon the nature of the double containment system. In FIG. 6, the encasement 38 is substantially T-shaped; in FIG. 7 the encasement 40 has a lateral branch; the encasement 42 in FIG. 8 is substantially V-shaped in plan or is provided with an elbow as in FIG. 1; the encasement 44 of FIG. 9 has two lateral offsets; while the encasement 46 of FIG. 10 is provided with an expansion loop 48. The method and structure for joining adjacent offset portions of each trench assembly or concrete encasement 14 is illustrated in FIGS. 11 to 13. While FIG. 11 illustrates the joinder of a pair of tank sections 14 arranged in a linear or tandem relation, the joint 50 thereof is illustrative and may be formed with the tank section disposed at virtually any angle with respect to each other between 0° and 180°.

As illustrated in FIG. 12, the joint 50 between adjacent encasements or tanks 14 may be formed by beveling out a trough 52 between the tanks 14 at their juncture, which is filled with a pool of concrete 54. A plastic extrusion 56 of an elastomer material having a stud 58 is spread over the width of the joint 50 with the stud 58 embedded in the concrete pool 54. The opposed ends of the extrusion 56 are welded at 60,62 to the adjacent liners 22 on each encasement or tank 14. An inverted U-shaped protective cap 64 is placed over the extrusion 56 and the bottom 68 of each leg 66 of cap 64 can be welded to each liner 22 on an adjacent encasement or tank 14. Cover 16 can then be sized and replaced on each encasement or tank 14. A wire 70 can be embedded in concrete pool 54 and be accessible at each lateral end of the joint 50 to test the welds at the joint.

What is claimed is:

1. A double containment assembly for a fluid carrying pipe comprising:
   a primary pipe adapted to conduct a fluid through the assembly;
   a concrete receptacle having a concrete cover housing said primary pipe;
   means within said concrete receptacle for supporting said primary pipe for longitudinal movement with respect to an elongated axis of said concrete receptacle;
   said concrete receptacle including a plastic liner precluding the penetration of fluid from the interior of said receptacle into said concrete;
   said cover including a plastic liner along its interior surface adapted to contact the top of the plastic liner on said concrete receptacle; and
   means for removably mounting said cover on said concrete receptacle to enable access to said primary pipe, including mating tabs on said cover and receptacle receiving fasteners therethrough.

2. A double containment assembly for a fluid carrying pipe comprising:
   a primary pipe adapted to conduct a fluid through the assembly;
   a concrete receptacle having a concrete cover housing said primary pipe;
   means within said concrete receptacle for supporting said primary pipe for longitudinal movement with respect to an elongated axis of said concrete receptacle;
   said concrete receptacle including a plastic liner precluding the penetration of fluid from the interior of said receptacle into said concrete;
   said cover also including a plastic liner along its interior surface adapted to contact the top of the plastic liner on said concrete receptacle, wherein said liner includes studs embedded in said concrete of said receptacle and said cover.

3. A double containment assembly for a fluid carrying pipe comprising:
   a primary pipe adapted to conduct a fluid through the assembly;
   a concrete receptacle having a concrete cover housing said primary pipe;
   means within said concrete receptacle for supporting said primary pipe for longitudinal movement with respect to an elongated axis of said concrete receptacle;
   said concrete receptacle including a plastic liner precluding the penetration of fluid from the interior of said receptacle into said concrete;
   said cover also including a plastic liner along its interior surface adapted to contact the top of the plastic liner on said concrete receptacle, wherein said interior support means includes:
   a double I-beam support structure spaced along the bottom of said concrete receptacle, each of said double I-beam support structures having an opening slidably receiving said primary piping therethrough.

4. The double containment assembly of claim 3 wherein at least portions of said double I-beam support structures are coated with a plastic material locked to said plastic liner in said concrete receptacle.

5. A double containment assembly for a fluid carrying pipe comprising:
   at least one primary pipe adapted to conduct a fluid through the assembly;
   a plurality of concrete receptacles joined together at an angle between 0° and 180°, each receptacle having a concrete cover and housing said primary pipe;
   means within each of said concrete receptacles for supporting said primary pipe for longitudinal movement with respect to an elongated axis of said concrete receptacle;
   each of said concrete receptacles including a plastic liner precluding the penetration of fluid from the interior of said receptacle into said concrete;
   each of said covers also including a plastic liner along its interior surface adapted to contact the top of the plastic liner on said respective concrete receptacle, wherein:
   said concrete receptacles are joined by a plastic extrusion extending between the plastic liner of each of said receptacles along the line of joinder; and
   a primary pipe extends through each of said receptacles and is supported therein.

6. The double containment assembly of claim 5 wherein:
   a trough is formed along the line of joinder between each of said receptacles; and
   a concrete footing is disposed within said trough receiving a portion of said extrusion embedded therein.

7. The double containment assembly of claim 6, including:
   a protective cap overlying the line of joinder between said concrete receptacles.

8. A double containment assembly, comprising:
   at least one primary pipe;
   at least one secondary containment pipe receiving the at least one primary pipe;

a junction assembly including a concrete receptacle defining a side wall coupled to the at least one secondary containment pipe terminating adjacent and sealed in relation to the side wall, and defining at least one entrance opening for receiving at least one primary pipe into the receptacle, the concrete receptacle including at least two sections, wherein each section defines a longitudinal axis substantially parallel to a longitudinal axis of at least one primary pipe within the receptacle, and the at least two sections of the concrete receptacle are coupled together and oriented at an angle of less than 180° relative to each other for alleviating at least one of expansion and contraction of the at least one primary pipe.

9. A double containment assembly as defined in claim 8, further comprising means for supporting the at least one primary pipe within the receptacle and for permitting movement of the at least one primary pipe in the direction of a longitudinal axis of the receptacle in response to at least one of expansion and contraction of the at least one primary pipe.

10. A double containment assembly as defined in claim 9, wherein the means for supporting includes a beam support.

11. A double containment assembly as defined in claim 10, wherein the beam support defines at least one aperture for receiving and supporting the at least one primary pipe.

12. A double containment assembly as defined in claim 10, wherein the beam support is a double beam support.

13. A double containment assembly as defined in claim 8, wherein the concrete receptacle further comprises a lining precluding the penetration of fluid from the interior of the receptacle into the concrete.

14. A double containment assembly as defined in claim 13, wherein the lining includes studs embedded in the concrete of the receptacle.

15. A double containment assembly as defined in claim 8, wherein the concrete receptacle includes an opening for access to the interior of the receptacle, a cover for closing the receptacle, and a plurality of tabs on at least one of the cover and the receptacle, each tab defining an aperture for receiving a fastener for coupling the cover to the receptacle.

16. A double containment assembly, comprising:
at least one primary pipe;
at least one secondary containment pipe for receiving the at least one primary pipe;
at least two underground concrete containment tanks, at least one tank including a side wall defining an entrance opening for receiving at least one primary pipe, the side wall being coupled to the at least one secondary containment pipe terminating adjacent to and sealed in relation to the side wall, each tank including a lining for precluding the penetration of fluid from the interior of the tank into the concrete, and defining at least one open end for coupling to an adjacent tank, the at least two tanks being coupled together in an end to end relationship forming a line of joinder between the tanks; and
a plastic joint liner extending between the linings along each line of joinder.

17. A double containment assembly as defined in claim 16, wherein a recess is formed along the line of joinder, and a concrete footing is disposed within the recess for receiving a portion of the joint liner embedded therein.

18. A double containment assembly as defined in claim 16, wherein the joint liner includes at least one stud embedded within the concrete footing.

19. A double containment assembly as defined in claim 16, further including a protective cap overlying an exterior portion of the line of joinder between adjacent receptacles.

20. A double containment assembly for a fluid carrying pipe comprising:
a primary pipe for conducting a fluid through the assembly;
a concrete receptacle having a concrete cover housing the primary pipe;
means within the concrete receptacle for supporting the primary pipe for longitudinal movement with respect to an elongated axis of the concrete receptacle;
the concrete receptacle and cover each including at least one first liner precluding the penetration of fluid from the interior of the receptacle into the concrete; and
at least one second liner seated between the cover and the receptacle to prevent the penetration of fluid from the interior of the receptacle through the interface between the cover and the receptacle, the second liner being formed of at least two portions defining a substantially sinusoidal seam between the at least two portions.

* * * * *